United States Patent Office 3,227,669
Patented Jan. 4, 1966

3,227,669
HYDROCARBON WAX-ETHYLENE POLYMER
COMPOSITIONS
Richard W. Sauer, Haddonfield, N.J., assignor to The
Atlantic Refining Company, Philadelphia, Pa., a corporation of Pennsylvania
No Drawing. Filed Sept. 6, 1961, Ser. No. 136,209
12 Claims. (Cl. 260—28.5)

This invention relates to compositions comprising a hydrocarbon wax and a hydrocarbon polymer of ethylene. More particularly, this invention relates to compositions comprising a hydrocarbon wax and a polymer of ethylene or copolymer of ethylene with an alpha-olefin.

It is well known to modify hydrocarbon waxes with small quatities of relatively low molecular weight hydrocarbon polymers generally in amounts of from 0.5 weight percent to 2.0 weight percent of the polymer. It was found that by this means hydrocarbon wax of poor quality could be improved so that it had substantially the same properties as hydrocarbon wax of high quality when used as a coating or laminating agent. In general, however, these compositions retained the characteristics of the wax in which the hydrocarbon polymer was incorporated. Thus, if the wax was hard and brittle such as, for example, paraffin wax, the low molecular weight hydrocarbon polymers did not greatly improve the brittleness characteristics.

Small quantities of hydrocarbon waxes also have been blended with hydrocarbon polymers in order to render such polymers somewhat more readily workable during fabrication, for example, in extrusion and molding operations. Since in all such compositions some polymer quality is sacrificed for this workability, the amount of wax used to dilute the polymer was limited to a maximum of 15 to 20 weight percent of wax.

It has now been found that certain hydrocarbon polymers may be combined with relatively large amounts of hydrocarbon waxes to produce compositions having desirable hardness and stiffness without being brittle, i.e., they are tough and have good impact strength. Moreover, these compositions are readily workable in conventional plastics fabrication equipment.

It is an object of this invention to provide compositions of a hydrocarbon wax and a hydrocarbon polymer of ethylene.

It is another object of this invention to provide compositions of a petroleum hydrocarbon wax and a polymer of ethylene or copolymers of ethylene with an alpha-olefin.

It is another object of this invention to provide compositions of a petroleum hydrocarbon wax and a polymer of ethylene or copolymer of ethylene with an alpha-olefin which have plastic properties and can be fabricated in conventional plastic processing equipment.

Other objects of this invention will be apparent from the description and the claims that follow.

The compositions of this invention are prepared by admixing a hydrocarbon wax, in particular a hydrocarbon wax of petroleum origin, such as paraffin wax, microcrystalline wax, or mixtures thereof, with certain hydrocarbon polymers of ethylene having specific intrinsic viscosity-density relationships.

The paraffin waxes which are suitable for use in this invention are those melting between about 100° F. and 160° F. and, in particular, paraffin waxes melting between about 120° F. and 155° F. are suitable. Petroleum microcrystalline waxes melting between about 130° F. and 200° F. and, in particular, those melting from 145° F. to 180° F., are also suitable for use in this invention. Higher melting point waxes, such as synthetic waxes, for example, the so-called Fischer-Tropsch waxes melting in the range from 200° F. to 220° F. and higher may also be employed as well as mixtures of these various hydrocarbon waxes which have been described.

The hydrocarbon polymers of ethylene for use in compositions with the above-mentioned hydrocarbon waxes are certain hydrocarbon polymers of ethylene and certain copolymers of ethylene with alpha-olefins having from 3 to 16 carbon atoms in the alpha-olefin molecule. The preferred alpha-olefin is propylene. However, good results have been obtained with the other straight-chain alpha-olefins having from 4 to 16 carbon atoms. The polymers suitable for this invention are further characterized by having an intrinsic viscosity [η] in the range given by the expression $$.02 < [\eta]^{-1} < 1.8 - 1.8\left(\frac{d_\mathrm{p} - .813}{.157}\right)$$

wherein $d_\mathrm{p}$ is the density of the polymer and ranges from 0.86 to 0.97 gram per cc. Polymers having an intrinsic viscosity in the range given by the expression $$.02 < [\eta]^{-1} < 1 - \left(\frac{d_\mathrm{p} - .813}{.157}\right)$$

wherein $d_\mathrm{p}$ is the density of the polymer and ranges from 0.88 to 0.97 gram per cc. are preferred.

Polymers having intrinsic viscosities greater than 50, i.e., $[\eta]^{-1} < .02$, would have extremely high molecular weight. Hence this limit is a practical upper limit.

Although intrinsic viscosity is related directly to molecular weight as pointed out by Staudinger and others, in the very high molecular weight ranges the so-called Staudinger rule and the Staudinger "constants" are frequently seriously in error. Consequently, owing to this uncertainty, high polymers are preferably characterized solely by their intrinsic viscosity without the intrinsic viscosity being converted into molecular weights. In general, as has been pointed out, the ethylene polymers heretofore admixed with wax were of the low molecular weight type and had relatively low intrinsic viscosities, i.e. of the order of 1.0 or less with density of 0.91 gram per cc. or higher. In order to satisfy the requirements of this invention, if the polymer has a density of 0.91 it should have an intrinsic viscosity greater than 1.45 and preferably greater than 2.62. As will be seen hereinafter the polymers most preferred in this invention have intrinsic viscosities in excess of 1.6, but such polymers have density-intrinsic viscosity relationships which satisfy the equations set forth above.

The quantity of the hydrocarbon polymers of ethylene which may be incorporated with the hydrocarbon wax to produce the compositions of this invention ranges from 5 weight percent to 80 weight percent based on the weight of the total composition and preferably from 25 weight percent to 50 weight percent based on the total composition. These compositions have been found to be suitable for fabrication by conventional plastics processing methods into extruded or molded shapes to produce plastic articles of the types normally produced in commerce; for example, bottles, containers, sheets, unsupported films and the like.

The ethylene polymers are made by the polymerization of the ethylene monomer utilizing aluminum alkyl-metal halide catalysts in accordance with well-known polymerization techniques. Catalysts such as aluminum triisobutyl-titanium tetrachloride and aluminum triisobutyl-vanadium oxytrichloride have been found to be particuarly suitable. Many other transition metal compounds such as $ZrCl_4$ and $CrOCl_2$, and organometallic compounds such as zinc alkyls, lithium aryls, chloromagnesium alkyls, and the like may be employed although not all of these are equally preferred for preparing the polymers for the compositions of this invention.

The ethylene alpha-olefin copolymers also are preferably made by the use of catalysts of this type. In general, the polymerization is carried out by introducing into a dried organic solvent, such as isooctane, the monomer such as ethylene, or the monomers such as ethylene and propylene (or higher alpha-olefins) until the solvent is saturated. The catalyst is then added to the monomer solution and the polymerization reaction is carried out for from two to four hours with continuous agitation and addition of monomer. The polymerization is stopped by discontinuing the introduction of the monomer or monomers and pouring the polymerization mixture into concentrated HCl contained in an alcohol such as isopropyl alcohol. The mixture is stirred and allowed to stand for several hours, for example, 18 hours. After standing, the solid is filtered from the alcohol and HCl solution. The filtered solid is preferably broken up into small pieces by shearing or similar means, and is thereafter washed with additional quantities of alcohol, and after filtering the last traces of alcohol from the solid, the solid is dried at 50° C., preferably under moderate vacuum. If desired, the copolymers may be made by separately partially polymerizing the ethylene and the alpha-olefin and thereafter admixing the polymers and completing the polymerization reaction to form the so-called block polymers.

The effect of operating variables on the molecular weight and thus on the intrinsic viscosity of polymers produced from the above catalysts has been studied extensively. Thus, as the concentration of the catalysts is decreased, the intrinsic viscosity is increased. Likewise when lower reaction temperatures are employed, higher intrinsic viscosities are obtained. High intrinsic viscosities are obtained as the concentration of the monomer or monomers is increased, for example, by increased pressure. Thus the methods of obtaining polymers or copolymers having desired intrinsic viscosities are based on known operating principles.

Likewise the density of a polymer can be controlled by catalyst composition in accordance with well-known principles and also the density of a copolymer can be controlled by adjusting the amount of alpha-olefin copolymerized with the ethylene. As the ratio of alpha-olefin to ethylene increases in the copolymer, the density decreases.

The amount of alpha-olefin in the copolymer is preferably less than the amount of ethylene and most preferably the amount of alpha-olefin is less than about 30 weight percent of the copolymer. Obviously, if the amount of alpha-olefin is nil the polymer is a polyethylene which, provided it has the critical intrinsic viscosity-density relationships, is also suitable for the compositions of this invention.

Since the polymers to be incorporated with the hydrocarbon wax to form the compositions of this invention are of rather high molecular weight, the conventional methods utilized in admixing low molecular weight polymers with wax are not as satisfactory for producing the instant compositions. In some instances, a Banbury mixer has been used satisfactorily. With the highest molecular weight polymers, however, a twin screw type extruder having worms used for general compounding has been found to be a preferred means for admixing the components. In this machine, the polymer and wax are dry-blended in the desired proportions and introduced into the machine where they are heated to the temperatures to the order of 300–400° F. and extruded through a die designed to form a ⅛-inch diameter rod. If desired, the polymer may be introduced into the machine in the solid condition and the wax molten.

EXAMPLE I

A sample of 2,2,4-trimethyl pentane was dried and 3200 cc. were placed in a 4-liter capacity resin flask supplied with a stirrer and means for introducing hydrocarbon monomers. The solvent was purged with nitrogen and thereafter ethylene and propylene were introduced into the solvent at the rate of 1.25 liters per minute of ethylene and 0.25 liter per minute of propylene. A 3.36 gram portion of aluminum triisobutyl was added to the solution followed by 3.11 grams of titanium tetrachloride. The polymerization was allowed to proceed for 4 hours during which time the ethylene and propylene were continuously introduced into the reaction mixture at the same rate as utilized to saturate the solvent, the mixture being constantly and vigorously agitated. The polymerization was carried out under atmospheric pressure and the temperature increased from 75° F to 108° F. during the reaction. At the end of 4 hours the introduction of the monomers was discontinued and the reaction mixture was poured into a solution consisting of 500 cc. of concentrated HCl (37.6 percent) in 5 liters of isopropyl alcohol. The mixture was stirred and then allowed to stand for 18 hours. After standing the solid was filtered from the alcohol and hydorchloride solution and broken up in a high shear mixer with additional isopropyl alcohol. The solid copolymer was washed with additional quantities of isopropyl alcohol and finally filtered and dried under moderate vacuum (10 mm. Hg pressure) at a temperature of 50° C. The yield of copolymer obtained was 144 grams or 22.2 grams of polymer per gram of catalyst. The properties of this copolymer are set forth in Table I under the designation "Sample 1."

EXAMPLE II

Another copolymer was prepared by introducing 4 liters of dried 2,2,4-trimethyl pentane into a 5-liter capacity resin flask fitted with a stirring means for vigorous agitation. This solvent was saturated with ethylene and propylene by introducing these monomers at the rate of 3.5 liters per minute for the ethylene and 0.7 liter per minute for the propylene. After saturating the solvent, 13.9 grams of aluminum triisobutyl and 6.1 grams of vanadium oxytrichloride were added. The reaction was carried out for ½-hour with the same monomer addition rate utilized to saturate the solvent. After ½-hour, the monomer addition rate was reduced to 2.2 liters per minute for the ethylene and 0.44 liter per minute for the propylene and the reaction allowed to continue for another 1½ hours at this rate. The reaction was carried out at atmospheric pressure, and during the reaction the temperature increased from 84° F. to 127° F. The polymerization reaction mixture was poured into methanol containing 10 volume percent of concentrated HCl. After standing, the polymer was placed in a high shear mixer with adidtional methanol and broken up into small pieces which were washed with methanol and dried in the same manner as described for the copolymer of Example I. A yield of 233 grams of copolymer was obtained or 11.7 grams per gram of catalyst. The properties of this copolymer are set forth in Table I under the designation "Sample 2."

EXAMPLE III

A large sample of copolymer was prepared by introducing 37 gallons of dried 2,2,4-trimethyl pentane into a glass-lined reactor vessel provided with a stirrer for agitation. The solvent was saturated with a mixture of ethylene and propylene at a rate of 2.9 cu. ft. per minute with a ratio of 9.4 volumes of ethylene to 1 volume of propylene and then the catalyst was added. A catalyst solution consisting of 2,2,4-trimethyl pentane containing 1.5 grams of catalyst per 100 cc. was prepared. The catalyst consisted of a mixture of aluminum triisobutyl and vanadium oxytrichloride having an aluminum to vanadium molar ratio of 2:1. The quantity of catalyst solution added was such that the concentration of catalyst in the solvent of the reaction mixture was 0.024 grams of catalyst per 100 cc. of solution.

The polymerization reaction was carried out for 2½ hours with the constant addition of ethylene and propylene at the rate of 2.9 cu. ft. per minute in the ratio of 9.4 volumes of ethylene to 1 volume of propylene and with 4 separate additions of catalyst solution during the reaction so that the final catalyst concentration was 0.188 gram of catalyst per 100 cc. of solvent in the reaction mixture. Initial reaction temperature was 63° F. and the temperature increased to 124° F. during the reaction. The reaction was carried out at atmospheric pressure under vigorous agitation. The reaction was stopped by the addition to the reaction vessel of 10 gallons of methyl alcohol containing six pounds of 37 percent concentration aqueous HCl. After agitation the mixture was allowed to settle and the hydrocarbon phase was decanted from the aqueous phase.

The copolymer was washed with seven separate washes of methyl alcohol of 20 to 25 gallons each with the polymer being filtered free of wash solvent after each wash. The total copolymer produced was 10,650 grams or 30.2 grams of copolymer per gram of catalyst. The copolymer was oven dried at 150° F. at atmospheric pressure. The properties of this polymer are set forth in Table I under the designation of "Sample 3."

EXAMPLE IV

To a 5-liter resin flask fitted with a stirring means for vigorous agitation were added 4 liters of dried 2,2,4-trimethyl pentane. This solvent was saturated with ethylene and thereafter 1.39 grams of aluminum triisobutyl and 0.61 gram of vanadium oxytrichloride catalyst were added. The reaction was continued for 2½ hours at a temperature ranging between 53° C. and 77° C. with an ethylene addition rate of 300 grams per hour. The polyethylene was recovered in the same manner as described for the copolymer in Example II with approximately the same yield and its properties are set forth in Table I under the designation "Sample 4."

EXAMPLE V

A large sample of high density polyethylene was prepared by saturating with ethylene 34.5 gallons of dried 2,2,4-trimethyl pentane contained in a glass-lined reactor vessel. A catalyst solution consisting of 2,2,4-trimethyl pentane containing 1.46 grams of catalyst per 100 cc. was prepared. The catalyst consisted of a mixture of aluminum triisobutyl and vanadium oxytrichloride having a molar ratio of aluminum to vanadium of 2:1. A portion of this catalyst solution was added to the isooctane saturated with ethylene to give an initial catalyst concentration of 0.006 gram per 100 cc. of solvent in the reactor. The reaction was continued for 3 hours during which time additional catalyst solution was added in increments to give a final catalyst concentration of 0.083 gram per 100 cc. of solvent in the reactor. The temperature during the reaction ranged between 76° and 101° F. and a pressure of 125 p.s.i.g. was employed with continuous addition of ethylene at the rate of 2.8 cu. ft. per minute during the reaction.

The reaction was stopped by adding to the reaction mixture 10 gallons of methyl alcohol containing six pounds of aqueous HCl of 37 percent concentration. The hydrocarbon phase was decanted from the aqueous phase and an additional 10 gallons of the methyl alcohol containing 6 pounds of 37 percent concentration aqueous HCl was added. After separating the aqueous and hydrocarbon phases, the polymer phase was washed six times with 20 to 25 gallons of anhydrous methyl alcohol in each wash, the polymer being filtered free of solvent after each wash. The polymer was dried in an oven at 150° F. under atmospheric pressure. A yield of 15,600 grams of polyethylene was obtained or 133 grams of polyethylene per gram of catalyst. The physical properties of this polymer are set forth in Table I under the designation "Sample 5."

EXAMPLE VI

A sample of 2,2,4-trimethyl pentane was dried and 3200 cc. were placed in a resin flask provided with a stirrer and means for introducing gaseous ethylene. Twenty milliliters of hexadecene-1 were added to the 2,2,4-trimethyl pentane and ethylene introduced at the rate of 1.5 liters per minute to saturate the solution. A catalyst consisting of 1.76 grams of aluminum triisobutyl and 0.41 gram of titanium tetrachloride was added to the solution. The polymerization reaction was carried out under atmospheric pressure for a total of 4 hours during which time the reaction temperature increased from 70° F. to 104° F. After each 30 minutes during the reaction, 5 cc. of hexadecene-1 were added and ethylene was added continuously during the reaction at the rate of 1.5 liters per minute. The reaction was stopped and the polymer was recovered in the same manner as described for the copolymer of Example I. The yield of copolymer was 120 grams or 27.6 grams per gram of catalyst. The properties of this copolymer are set forth in Table I under the designation "Sample 6."

In Table I the densities were determined by ASTM Method D1505-60T. The maximum upper limit permitted for the reciprocals of the intrinsic viscosities in accordance with the critical limits of this invention were calculated from the equation:

$$[\eta]^{-1} = 1.8 - 1.8\left(\frac{d_p - .813}{.157}\right)$$

wherein $[\eta]^{-1}$ is the reciprocal of the intrinsic viscosity and $d_p$ is the density of the polymer or copolymer.

The actual intrinsic viscosities were determined by ASTM Method D1601-59T which values are shown in Table I as reciprocals.

The approximate quantity of propylene in the copolymers was calculated from the methyl branching of the chain which was determined by infra-red analysis in accordance with the method described by A. H. Willbourn in Journal of Polymer Science, vol. 34, pages 569-597 (1959), and by M. C. Harvey and Larry L. Peters, in Analytical Chemistry, vol. 32, page 1725 (1960).

Table I

| Sample No. | Density of Polymer Grams/cc. | Calculated Maximum for $[\eta]c^1$ | Actual Value of $[\eta]c^1$ | Approximate Percent of Propylene |
|---|---|---|---|---|
| 1 | 0.889 | 0.93 | 0.392 | 14.8 |
| 2 | 0.888 | 0.94 | 0.185 | 17.4 |
| 3 | 0.911 | 0.68 | 0.144 | 9.8 |
| 4 | 0.944 | 0.30 | 0.109 | |
| 5 | 0.954 | 0.18 | 0.069 | |
| 6 | 0.946 | 0.28 | 0.069 | |

EXAMPLE VII

A number of polyethylenes and ethylene-propylene copolymers available from various manufacturers either in commercial or experimental quantities were tested for producing the compositions of this invention. Their properties, method of manufacture and composition are set forth in Table II.

tions. The composition either passes or fails at these conditions, indicating whether the composition is suitable for

*Table II*

| Sample No. | Composition | Method of Manufacture | Density | Calculated Maximum for $[\eta]^{-1}$ | Actual Value of $[\eta]^{-1}$ |
|---|---|---|---|---|---|
| 7 | Ethylene-Propylene Copolymer 26.0 per cent propylene. | Low pressure process, aluminum alkyl-transition metal type catalyst. | 0.886 | 0.96 | 0.629 |
| 8 | Ethylene-Propylene Copolymer 12.6 per cent propylene. | Low pressure process, aluminum alkyl-transition metal type catalyst. | 0.914 | 0.64 | 0.633 |
| 9 | High density polyethylene | Low pressure process, aluminum alkyl-transition metal type catalyst. | 0.940 | 0.34 | 0.241 |
| 10 | High density polyethylene | Low pressure process, silica-alumina-chromic oxide catalyst. | 0.952 | 0.21 | 0.510 |
| 11 | Low density polyethylene | High pressure process | 0.920 | 0.57 | 0.764 |
| 12 | High density polyethylene | Low pressure process, aluminum alkyl-transition metal type catalyst. | 0.943 | 0.31 | 0.390 |
| 13 | High density polyethylene | Low pressure process, silica-alumina-chromic oxide catalyst. | 0.947 | 0.26 | 0.46 |
| 14 | Low density polyethylene | High pressure process | 0.920 | 0.57 | 1.15 |

EXAMPLE VII

Each of the above-described polymer samples (Examples I through VII) was admixed with an equal weight of use in fabricating articles to be used under normal ambient conditions. The results of these tests are set forth in Table III.

*Table III*

| Composition No. | Tensile Strength, p.s.i. | Ultimate Elongation, Percent | Flexural Modulus, p.s.i. | Flex Life Cycles to Failure | Room Temp. Impact |
|---|---|---|---|---|---|
| 1. (Polymer Sample No. 1 and Wax) | 1,500 | 0 | 52,000 | >20,000 | Pass. |
| 2. (Polymer Sample No. 2 and Wax) | 1,100 | 200 | 36,000 | >40,000 | Do. |
| 3. (Polymer Sample No. 3 and Wax) | 1,600 | 100 | 42,000 | >20,000 | Do. |
| 4. (Polymer Sample No. 4 and Wax) | 2,400 | 50 | 72,000 | 3,300 | Do. |
| 5. (Polymer Sample No. 5 and Wax) | 3,600 | 60 | 115,000 | >20,000 | Do. |
| 6. (Polymer Sample No. 6 and Wax) | 2,900 | 30 | 95,000 | 390 | Do. |
| 7. (Polymer Sample No. 7 and Wax) | 800 | 25 | 36,000 | >20,000 | Do. |
| 8. (Polymer Sample No. 8 and Wax) | 1,400 | 0 | 58,000 | 1 | Do. |
| 9. (Polymer Sample No. 9 and Wax) | 2,200 | 0 | 77,000 | 1 | Do. |
| 10. (Polymer Sample No. 10 and Wax) | 2,100 | 0 | 74,000 | 1 | Fail. |
| 11. (Polymer Sample No. 11 and Wax) | 1,200 | 0 | 80,000 | 1 | Do. |
| 12. (Polymer Sample No. 12 and Wax) | 1,400 | 0 | 92,000 | 1 | Do. |
| 13. (Polymer Sample No. 13 and Wax) | 1,800 | 0 | 121,000 | 1 | Do. |
| 14. (Polymer Sample No. 14 and Wax) | 1,200 | 0 | 48,000 | 1 | Do. | petroleum paraffin wax of about 71 percent normal paraffin content having a melting point of about 150° F. The method of mixing utilized was the Banbury mixer or the twin-screw type mixer as the case required. Each mixture of polymer and wax was injection molded into test specimens. Tensile strengths and elongations were determined by ASTM Method D412–51T (Die D). Flexural modulus was measured by ASTM Method D797–58 and the flex life of the samples was determined by subjecting injection molded strips (1¼ inch long, ½ inch wide and 1/16 inch thick) of each composition to repeated double flexing (alternating direction), 90° angle bends, at a flex rate of 25 double flexes (25 cycles) per minute at a temperature of 73° F. and a relative humidity of 50 percent, the flex life being the total number of cycles to failure which is determined by the specimen being cracked through one-half its width.

Each composition was also tested for its resistance to impact at room temperature. The test apparatus used was that employed in ASTM Method D746–57T for measuring the brittleness of elastomers by impact. In the instant test, however, instead of utilizing a range of temperatures, 5 test strips of each composition were subjected to impact at 73° F. and 50 percent relative humidity condi- It will be seen from the above tests that all of the compositions possess tensile strengths which are sufficiently high to provide useful plastic fabricated articles. The first six samples possess flex lives sufficiently high to demonstrate that the composition is not brittle, and the fact that they all passed the impact test indicates the compositions to be exceedingly tough. In general, these first six compositions also have good elongation and a flexural modulus which indicates a strong, tough plastic composition. All of these have density-intrinsic viscosity relationships which satisfy not only the critical range as defined by the expression $$[\eta]^{-1} < 1.8 - 1.8\left(\frac{d_p - .813}{.157}\right)$$

but also fall within the preferred range wherein the intrinsic viscosity and density satisfy the following relationship:

$$[\eta]^{-1} < 1 - \left(\frac{d_p - .813}{.157}\right)$$

wherein in such expressions $[\eta]$ is intrinsic viscosity and $d_p$ is density of the polymer.

The respective calculated maximum values of $[\eta]^{-1}$ from the second of the above expressions are for Sample No. 1, 0.516; Sample No. 2, 0.523; Sample No. 3, 0.376; Sample No. 4, 0.166; Sample No. 5, 0.012 and Sample No. 6, 0.153. It will be seen that the actual values of $[\eta]^{-1}$ for each of the samples is less than the aforementioned calculated values. Consequently, the compositions produced from these polymers are the most preferred, and the properties obtained as shown in Table III demonstrate this fact.

Compositions 7, 8 and 9 are made from polymers which fall within the critical range of the density-intrinsic viscosity relationship but are not in the most preferred range. Thus, the calculated maximum values for $[\eta]^{-1}$ from the expression for the preferred range are Sample No. 7, 0.535; Sample No. 8, 0.356 and Sample No. 9, 0.190. Referring to Table III, it will be seen that compositions made from these polymers although they are tough as shown by the fact they passed the impact test, tend to be brittle (Compositions 8 and 9) as shown by the low flex life.

Polymers 10 through 14 have density intrinsic-viscosity relationships which fall outside of the critical range, and it will be seen by reference to Table III that compositions prepared from these polymers are exceedingly brittle since they have very low flex life and zero elongations, and in addition fail the impact test. Consequently, these compositions are not suitable for the fabrication of plastic articles which will be subjected to normal conditions of use.

EXAMPLE IX

One part by weight of polymer Sample No. 5 was admixed with three parts by weight of the same wax of 150° F. melting point utilized in Example VIII. The resulting composition had a tensile strength of 2600 p.s.i., 30 percent elongation to break, a flex life of more than 20,000 cycles and a flex modulus of 105,000 p.s.i. showing that this composition had highly desirable properties even when the wax component mounted to 75 weight percent of the total composition.

Minor amounts of additives may be incorporated into the compositions of this invention, for example, pigments, fillers, oxidation inhibitors and the like without deleteriously effecting the desired useful properties of the composition.

The foregoing examples illustrate certain specific and preferred embodiments of the invention; however, it is to be understood that variations from these embodiments may be made without departing from the scope of the claims.

I claim:

1. A composition consisting essentially of a hydrocarbon wax and from 5 weight percent to 80 weight percent based on the weight of the total composition of a hydrocarbon polymer selected from the group consisting of polyethylene and copolymers of ethylene with propylene wherein the amount of propylene in the copolymer is less than the amount of ethylene, and said hydrocarbon polymer being characterized by having an intrinsic viscosity $[\eta]$, which satisfies the expression $$0.02 < [\eta]^{-1} < 1.8 - 1.8\left(\frac{d_p - .813}{.157}\right)$$

wherein $d_p$ is the density of said hydrocarbon polymer and ranges from 0.86 to 0.97.

2. The composition of claim 1 wherein the hydrocarbon polymer ranges from 25 weight percent to 50 weight percent of the total composition.

3. The composition of claim 1 wherein the hydrocarbon wax is a petroleum microcrystalline wax.

4. The composition of claim 1 wherein the hydrocarbon wax is a petroleum paraffin wax.

5. The composition of claim 4 wherein the hydrocarbon polymer is polyethylene.

6. The composition of claim 4 wherein the hydrocarbon polymer is a copolymer of ethylene with propylene wherein the propylene is less than about 30 weight percent of said copolymer.

7. A composition consisting essentially of a hydrocarbon wax and from 5 weight percent to 80 weight percent based on the weight of the total composition of a hydrocarbon polymer selected from the group consisting of polyethylene and copolymers of ethylene with propylene wherein the amount of propylene in the copolymer is less than the amount of ethylene, and said hydrocarbon polymer being characterized by having an intrinsic viscosity $[\eta]$, which satisfiies the expression $$0.02 < [\eta]^{-1} < 1 - \left(\frac{d_p - .813}{.157}\right)$$

wherein $d_p$ is the density of said polymer and ranges from 0.88 to 0.97.

8. The composition of claim 7 wherein the hydrocarbon polymer ranges from 25 weight percent to 50 weight percent of the total composition.

9. The composition of claim 7 wherein the hydrocarbon wax is a petroleum microcrystalline wax.

10. The composition of claim 7 wherein the hydrocarbon wax is a petroleum paraffin wax.

11. The composition of claim 10 wherein the hydrocarbon polymer is polyethylene.

12. The composition of claim 10 wherein the hydrocarbon polymer is a coplymer of ethylene with propylene wherein the propylene is less than about 30 weight percent of said copolymer.

References Cited by the Examiner

UNITED STATES PATENTS

| | | | |
|---|---|---|---|
| 2,691,647 | 10/1954 | Field et al. | 260—28.5 XR |
| 2,728,735 | 12/1955 | Anderson | 260—28.5 |
| 2,761,851 | 9/1956 | Joanen | 260—28.5 |
| 3,030,322 | 4/1962 | Schrader | 260—28.5 |
| 3,157,610 | 11/1964 | Richardson | 260—28.5 |

OTHER REFERENCES

Renfrew et al.: "Polychene," 2nd edition, Iliffe and Sons Limited, London, 1960, page 179.

MORRIS LIEBMAN, *Primary Examiner.*

MILTON STERNMAN, *Examiner.*